Patented June 5, 1923.

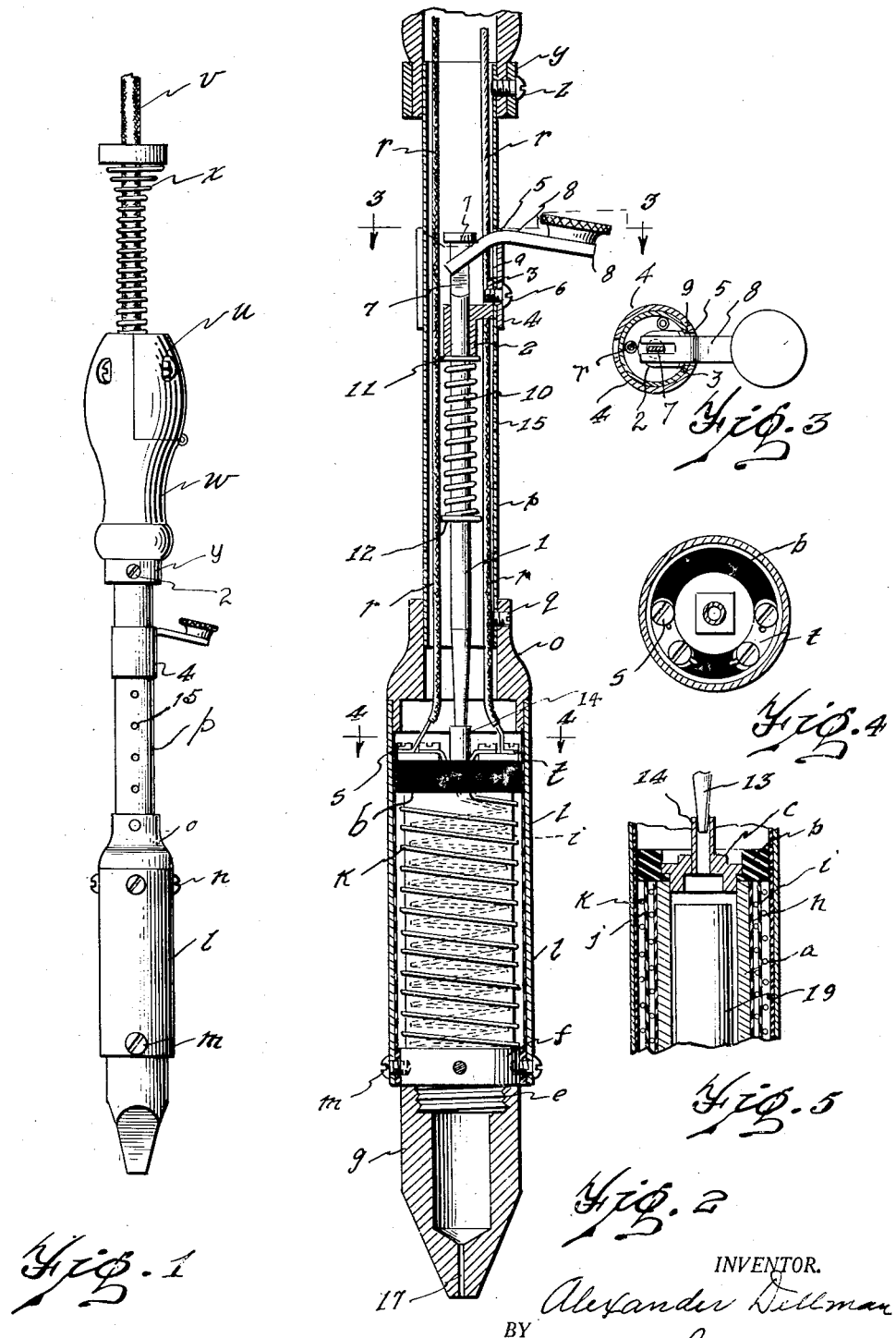

1,457,508

UNITED STATES PATENT OFFICE.

ALEXANDER DELLMAN, OF MOUNT CLEMENS, MICHIGAN.

FOUNTAIN SOLDERING TOOL.

Application filed May 16, 1921. Serial No. 470,146.

*To all whom it may concern:*

Be it known that I, ALEXANDER DELLMAN, a citizen of the United States, residing at Mount Clemens, in the county of Macomb and State of Michigan, have invented certain new and useful Improvements in Fountain Soldering Tools, of which the following is a specification.

This invention relates to fountain soldering tools. It has for its object the substitution of an easily controlled electrically heated solder distributer in place of the old soldering iron. Such a tool is not broadly new but the tool shown in the drawings hereinafter described in detail has several features that are believed to be improvements over the prior art.

The tool is provided with a solder-containing chamber that is co-axial with the tool. The tool is also provided with a control valve which is co-axial with the main body of the tool and which does not run through the solder chamber. The flow of solder through the discharge orifice is nicely controlled simply by closing off or admitting air to the solder-containing chamber. This eliminates all gumming up of the control valve due to the solder collecting on the stem of the same. It also permits the use of a simple cylindrical cartridge that may be charged into the solder-containing chamber by simply unscrewing the tip.

The lead-in wires for the electric resistance element run back through the handle portion of the tool. Their fire-proof insulation is further protected by the air vents which provide the air to eject the solder from the tool. These and other features will be described in detail.

In the drawings,—

Fig. 1 is a side elevation of the tool.

Fig. 2 is a longitudinal section of the same.

Fig. 3 is a section on the line 3—3 of Fig. 2.

Fig. 4 is a section on the line 4—4 of Fig. 2.

Fig. 5 is a fragmentary section of the solder-containing chamber, showing the cartridge in place.

$a$ designates a metal barrel. On the upper end of this is a fiber collar $b$ held in place by the metal plug $c$ that fits tightly into the end of the barrel $a$. This plug is provided with a flange that engages a similar flange of the collar to assemble the fiber collar on the end of the barrel. The other end of the barrel is provided with external screw-threads $e$ and a metal collar $f$ is pinned on. This collar $f$ acts as a stop for the tip $g$ that screws onto the external threads $e$ of the barrel. The barrel $a$ is wrapped with an inner insulating wrapping of mica $h$. Around this is wound the inner winding $i$ of the resistance element. A second wrapping of mica $j$ separates the outer winding $k$ of the resistance element from the inner winding $i$. The collars $f$ and $b$ are of larger diameter than the outer winding and consequently prevent the outer winding coming in contact with the sheathing tube $l$. This sheathing tube is provided with openings through which the screws $m$ may pass to screw the lower end of the sheathing tube to the metal collar $f$. The upper end of the sheathing tube is provided with a perforation through which the screws $n$ may pass to secure the sheathing tube to the coupling head $o$.

The hollow stem $p$ can be fitted into the inner end of the coupling head $o$ and secured in place by the screw $q$. This hollow stem houses the lead-in wires $r$ which are preferably provided with a heat resisting electric insulation such as an asbestos composition. These wires are fastened to the double binding posts $s$ and $t$ on the insulating collar $b$ that is plainly shown in Figs. 2 and 4. They lead up through the hollow stem $p$ and are provided with suitable binding posts (not shown) located in the chamber reached through the lid $u$ in the handle. These binding posts permit the lead-in wires to be connected with the cable $v$. This cable $v$ is protected from abrasion by the familiar spiral spring $x$. The hollow stem $p$ is secured in the hollow wooden handle $w$ by means of the ring $y$ and the set screws $z$.

The control for the flow of the melted solder is very simple. It comprises a needle valve 1 guided in the hollow stem $p$. A guide sleeve 2 fits over the needle valve and is provided with a lip 3. The split sleeve 4 fits tightly around the hollow stem $p$ and is provided with a notch 5 in its upper surface. A screw 6 can be run into the threads in the split sleeve, the hollow stem $p$ and the lip 3. This obviously assembles the needle valve 1 in the center of the hollow stem. The inner end of the needle valve is flattened as at 7 and the forked lever 8 can straddle the flat portion. This is a bent lever which is assembled in place when the needle valve is assembled to the hollow stem as this bent lever passes through the opening 9 formed in the hollow stem $p$ and the notch 5 in the top of the split sleeve 4. The bent lever fulcrums on the lower wall of this notch 5. A coiled spring 10 engages around the needle valve and abuts at its inner end against the washer 11 that is against the guide sleeve 2 and at its outer end against the abutment 12 that is fast to the needle valve 1. Hence this spring 10 normally keeps the point 13 of the needle valve in the nipple 14 provided in the plug $c$. Air enters the hollow tube through the air vents 15 and tends to cool the insulation on the lead-in wires. When the needle valve 13 is opened by the depression of the bent lever 8 the air is free to flow into the solder-containing barrel $a$ to take the place of any solder that may flow out by gravity through the discharge orifice 17 in the tip $g$.

It is a well observed fact that in order to pour the contents of an ordinary receptacle air must be admitted to the receptacle to take the place of the heavier fluid flowing out. In an oil can, for instance, if the top vent is not open the air runs up through the spout and the oil itself, producing the peculiar gurgling sound that occurs. However, if the discharge orifice of the fluid is relatively small or of a capillary character this action will not occur. The fluid under such strong capillary attraction from the immediately adjacent walls will not permit the air to break up through the discharge orifice. The consequence is that ordinarily with only gravity to cause the flow the fluid will not flow unless it is open somewhere to the atmosphere. I take advantage of this principle of operation in controlling the flow of the solder. The solder-containing barrel $a$ is substantially air-tight at both ends and if an absolutely true fit of the plug or tip is not had, the fluid solder is sufficient to make it air-tight and the result is that with the valve 13 in its seat in the nipple 14, no sufficient air can enter to take the place of any solder that may flow through the orifice 17 by gravity. Hence as long as the needle valve is seated the flow of the solder is cut off. As soon as the needle valve is lifted by pressing the bent lever 8 the solder begins to flow again.

I am aware that needle valves have been used to regulate the opening in the discharge orifice of the solder-containing chamber or the tip but in such a position they either must be located to one side of the axis of the tool in a separate chamber or else they have to pass through the solder chamber, and of course, are solidified into the solder block every time the tool is allowed to cool. They are subjected to gumming and sticking, and are not at all satisfactory when so located. My air control for the solder-containing chamber eliminates passing the valve through or into immediate contact with the main body of the solder so the valve is protected from gumming and daubing and from being frozen into the solidifying solder. Furthermore, the needle valve is located co-axially in the stem of the tool, both a convenient place and making for a neat mechanical appearing tool. Furthermore and importantly, a solid cylinder or cartridge 19 of solder can be charged into the solder-containing chamber simply by unscrewing the tip $g$.

What I claim is:

1. In a fountain soldering tool, the combination of a substantially air-tight solder-containing chamber provided with a capillary discharge passage and an air port, and an air port valve for cutting off and permitting discharge from the discharge passage by controlling the admission of air under atmospheric pressure to said chamber through said air port.

2. In a fountain soldering tool, the combination of a substantially air-tight solder-containing chamber provided with an air port, a tip provided with a relatively small capillary discharge orifice and communicating with said solder-containing chamber, and a finger-operated valve cutting off and permitting the discharge of solder through said orifice by controlling the admission of air under atmospheric pressure through said air port to said solder-containing chamber.

3. In a fountain soldering tool, the combination of a substantially air-tight solder-containing chamber, a tip provided with a relatively small discharge orifice adapted to communicate with said chamber, and a spring-seated valve for cutting off the discharge of solder through the tip by preventing the admission of air under atmospheric pressure to the solder-containing chamber but permitting the flow of solder when the valve is lifted.

4. In a fountain soldering tool, the combination of a barrel wrapped with electric insulation and arranged to be substantially air tight when closed, an electric heat resisting element about said barrel, said barrel forming a solder-containing chamber, a tip removably connectable with said barrel and having a capillary orifice through the end of the tip, and means for controlling the admission of air under atmospheric pressure to said barrel forming said solder-containing chamber.

5. In a fountain soldering tool, the combination of a barrel for containing solder and provided at its inner end with an insulating collar and provided at its outer end with a collar, a plug fitting into the inner end of the barrel, a tip removably fitting into the outer end of the barrel, electric insulation wrapped around the barrel between the two collars, an electric resistance element supported on the electric insulation but the winding being of less diameter than the collars, and a sheathing tube in which said solder-containing barrel is contained.

6. In a fountain soldering tool, the combination of a solder-containing chamber provided with an orifice in one end and substantially air tight when closed, means closing the other end of the solder-containing chamber and having a relatively small outlet orifice for the discharge of the solder, a heating element contained around the said solder-containing chamber, and a needle valve which is normally closed and which can be opened to allow the admission of air under atmospheric pressure to the soldering chamber to permit the flow of solder through the discharge orifice.

7. In a fountain soldering tool, the combination of a barrel forming a solder-containing chamber substantially air tight when closed and having at one end a plug provided with an orifice therethrough and having in the opposite end a tip provided with a discharge orifice of relatively small diameter, an electric resistance element for heating said barrel to melt the solder, a needle valve in substantially co-axial relation with respect to said barrel and provided with a suitable guide, said needle valve guarding the opening through the plug in the inner end of the barrel, and means by which said needle valve may be manipulated to open the valve to permit the flow of solder through the discharge orifice in the tip due to atmospheric pressure.

8. In a fountain soldering tool, the combination of a solder-containing chamber substantially air tight when closed and provided with a member on one end through which is a relatively small discharge orifice, the other end of the solder-containing chamber provided with an air opening, means for heating said solder-containing chamber, a needle valve normally closing the opening through the air opening in the said chamber, and means for manipulating the needle valve to permit air under atmospheric pressure to pass into the said chamber to allow the discharge of solder through the delivery orifice.

9. In a fountain soldering tool, a sheathing tube, a solder-containing barrel located therein, a hollow stem connected with the sheathing tube, and a needle valve controlling the opening into said solder-containing barrel and provided with a guide sleeve that can be removably secured to the inside of the hollow stem to locate and guide the needle valve substantially co-axially of said hollow stem.

10. In a fountain soldering tool, the combination of a sheathing tube, a solder-containing barrel contained therein and provided at one end with a plug having an air vent opening therein, a hollow stem connecting with said sheathing tube and co-axial therewith and provided with vent ports, a needle valve guided co-axially in said hollow stem and guarding the air vent opening in the solder-containing barrel, an electric resistance element wound about the said solder-containing barrel and provided with lead-in wires that lead up through the hollow stem and are air-vented by the said ports in the said hollow stem.

11. In a fountain soldering tool, a sheathing tube, a solder-containing chamber in the form of a barrel provided at each end with collars, an electric resistance element wound about the soldering tube but having its windings of less diameter than the said collars, a tip communicating with the solder-containing chamber and provided with a discharge orifice, and means for controlling the flow of the solder through the discharge orifice.

12. In a fountain soldering tool, a sheathing tube, a solder-containing barrel plugged at its inner end and provided at its outer end with a collar to which the sheathing tube is fastened and also with a threaded projecting portion, and a removable plug screwing onto said threaded projecting portion, and an electric resistance element wound around the solder-containing barrel and spaced from the said sheathing tube.

13. In a fountain soldering tool, a sheathing tube, a solder-containing barrel plugged at one end and provided with an insulating collar at such end and provided at the outer end with a collar to which the sheathing tube is removably attached and also provided with a screw-threaded projecting portion, a tip removably screwing onto the said screw-threaded projecting portion, an electric insulating material wound about said solder-containing barrel intermediate the collars, and an electric resistance element wound on the said insulating material and having a winding diameter less than the said collars.

14. In a fountain soldering tool, a solder-containing chamber provided with an air vent opening, a sheathing tube in which is contained said solder-containing chamber, a hollow stem connected with the sheathing tube substantially co-axial therewith and provided with an orifice in its side, a notched sleeve fitted over said hollow stem adjacent said orifice, a needle valve contained within said hollow stem and guarding the said air vent in said solder-containing chamber, a guide sleeve through which said needle valve slides provided with a projecting lip, a screw passing through the said notched sleeve and adapted to engage in said lip for assembling the bearing sleeve in the hollow stem, and a lever adapted to engage the inner end of the needle valve and fulcrumed on the wall of the notch of the said sleeve about the hollow stem.

15. In a fountain soldering tool, the combination of a sheathing tube, a solder-containing chamber provided with an air vent contained therein, a hollow stem connected with the sheathing tube and substantially co-axial therewith, a guide sleeve removably secured to the interior of the hollow stem, a needle valve provided with a head and threaded through the guide sleeve and provided with a head at its inner end and a flattened surface there adjacent, said needle valve guarding said air vent in said solder-containing chamber, a forked lever engaging the said flattened needle valve portion and against the head of the needle valve, and means for removably fulcruming said lever on the side of the hollow stem.

In testimony whereof I affix my signature.

ALEXANDER DELLMAN.